US009197119B2

(12) United States Patent
Shiga (10) Patent No.: US 9,197,119 B2
(45) Date of Patent: Nov. 24, 2015

(54) PERMANENT MAGNET MOTOR AND WASHING MACHINE PROVIDED THEREWITH

(75) Inventor: Tsuyoshi Shiga, Tokyo (JP)

(73) Assignees: Kabushiki Kaisha Toshiba, Minato-ku, Tokyo (JP); Toshiba Consumer Electronics Holdings Corporation, Chiyoda-ku, Tokyo (JP); Toshiba Home Appliances Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 13/299,418

(22) Filed: Nov. 18, 2011

(65) Prior Publication Data

US 2012/0062078 A1   Mar. 15, 2012

Related U.S. Application Data

(63) Continuation of application No. PCT/JP2010/052856, filed on Feb. 24, 2010.

(30) Foreign Application Priority Data

May 20, 2009   (JP) ................................. 2009-121960

(51) Int. Cl.
*H02K 21/12*   (2006.01)
*H02K 29/08*   (2006.01)
(Continued)

(52) U.S. Cl.
CPC .............. *H02K 29/08* (2013.01); *H02K 1/2786* (2013.01); *H02K 29/03* (2013.01); *H02K 2213/03* (2013.01)

(58) Field of Classification Search
CPC .......... H02K 1/27; H02K 21/22; H02K 21/12
USPC ................... 310/156.26, 265, 156.23, 156.43, 310/156.44, 156.45, 156.46, 156.47, 156.56
See application file for complete search history.

(56) References Cited

U.S. PATENT DOCUMENTS

| 5,864,192 A * | 1/1999 | Nagate et al. ............ 310/156.05 |
| 2006/0108887 A1* | 5/2006 | Nitta et al. ............... 310/156.53 |

(Continued)

FOREIGN PATENT DOCUMENTS

| CN | 1973418 | 5/2007 |
| JP | 2006-157996 | 6/2006 |

(Continued)

OTHER PUBLICATIONS

English Language Abstract of JP 2006-157996 published Jun. 15, 2006.

(Continued)

*Primary Examiner* — Hanh Nguyen
*Assistant Examiner* — Jose Gonzalez Quinones
(74) *Attorney, Agent, or Firm* — DLA Piper LLP (US)

(57) ABSTRACT

A permanent magnet motor includes a rotor including a rotor core formed with magnet insertion holes and permanent magnets inserted into the insertion holes. The rotor core includes a plurality of pairs of divided cores. The divided cores of each pair are adjacent to each other, and one divided core of each pair has two ends formed with respective engagement convexities and the other divided core has two ends formed with respective engagement concavities. The permanent magnets included permanent magnets having a lower coercive force and permanent magnets having a higher coercive force. A number of the permanent magnets having the lower coercive force and a number of the permanent magnets having the higher coercive force for each of the divided cores are the same as the other divided cores such that the divided cores have an equal total flux such that the divided cores have an equal total flux.

8 Claims, 10 Drawing Sheets

(51) Int. Cl.
*H02K 1/27* (2006.01)
*H02K 29/03* (2006.01)

(56) References Cited

U.S. PATENT DOCUMENTS

| | | | | |
|---|---|---|---|---|
| 2006/0119204 | A1* | 6/2006 | Awazu et al. | 310/156.53 |
| 2007/0252454 | A1* | 11/2007 | Hayashi et al. | 310/71 |
| 2008/0036327 | A1* | 2/2008 | Hattori et al. | 310/156.05 |
| 2009/0115361 | A1* | 5/2009 | Nitta | 318/400.09 |
| 2010/0126234 | A1* | 5/2010 | Maekawa | 68/28 |

FOREIGN PATENT DOCUMENTS

| | | |
|---|---|---|
| JP | 2010226915 A * | 10/2010 |
| WO | WO 2006/001232 | 1/2006 |
| WO | WO 2009/060587 | 5/2009 |

OTHER PUBLICATIONS

International Search Report issued in PCT/JP2010/052856 on Mar. 30, 2010.
Office Action issued in KR 2011/7026216 on Oct. 30, 2012.
English Language Translation of Office Action issued in KR 2011/7026216 on Oct. 30, 2012.
Chinese Office Action issued in CN 2010800218355 dated Apr. 17, 2013.
English Language Translation of Chinese Office Action issued in CN 2010800218355 dated Apr. 17, 2013.
Japanese Office Action issued in JP 2009-121960 on Jul. 9, 2013.
Translation of Japanese Office Action issued in JP 2009-121960 on Jul. 9, 2013.
Chinese Office Action issued in CN 2010800218355 on Aug. 13, 2013.
Translation of Chinese Office Action issued in CN 2010800218355 on Aug. 13, 2013.
English Language Abstract of JP 2010-226915 published Oct. 7, 2010.
English Language Translation of JP 2010-226915 published Oct. 7, 2010.
English Language Abstract of JP 2006-157996 published on Jun. 15, 2006.
English Language Translation of JP 2006-157996 published Jun. 15, 2006.

* cited by examiner

PERMANENT MAGNET MOTOR AND WASHING MACHINE PROVIDED THEREWITH

CROSS-REFERENCE TO RELATED APPLICATIONS

This application is based upon and claims the benefit of priority from Japanese Patent Application No. 2009-121960 filed May 20, 2009 and International Application No. PCT/JP2010/052856 filed Feb. 24, 2010, the entire contents of both of which are incorporated herein by reference.

FIELD

Embodiments described herein relate to a permanent magnet motor including a rotor equipped with a number of permanent magnets and a washing machine provided with the permanent magnet motor.

BACKGROUND

An inverter drive system providing easy motor speed control has often been employed for control of a permanent magnet motor used in, for example, a drum type washing machine. Magnetic sensors are provided for detecting respective positions of magnetic poles of a rotor provided with permanent magnets as magnetic poles.

Furthermore, a magnetic flux content (an induced voltage) of the permanent magnets interlinked with a stator coil has been desired to be controlled during a low speed rotation period (a wash step and a rinse step) and during a high speed rotation period (a dehydration step) in the permanent magnet motor used in the drum type washing machine according to a rotational speed of a drum as a load to be driven.

However, the permanent magnets provided in the rotor of the permanent magnet motor are generally composed of a single type of permanent magnet. This results in a normally constant magnetic flux content of the permanent magnets. In this case, for example, when the rotor is composed of only permanent magnets each having a larger coercive force, an induced voltage generated by the permanent magnets rises enormously during a high-speed rotation period (a dehydration step), resulting in a possible insulation breakdown of electronic components or the like. On the other hand, when the rotor is composed of only permanent magnets each having a smaller coercive force, motor output power is reduced during a low-speed rotation period (a wash step or a rinse step).

In view of the above-described problem, a permanent magnet motor has been proposed in which a magnetic flux content of the permanent magnets is adjustable. This permanent magnet motor includes two types of permanent magnets provided in the rotor and having different coercive forces. The permanent magnets each having a lower coercive force are demagnetized or magnetized by an external magnetic field (magnetic field produced by current flowing into the stator coil) so that the magnetic flux content of the permanent magnets is adjusted.

Another proposed permanent magnet motor includes permanent magnets each having a larger coercive force and permanent magnets each having a smaller coercive force, both of which are provided in a part of the rotor interior constituting one magnetic pole. More specifically, one magnetic pole is constituted by a plurality of types of permanent magnets. This enormously increases the number of permanent magnets and necessitates reduction in cubic volumes of the permanent magnets, resulting in a complex structure of the permanent magnet motor.

In order that the above-described problem may be overcome, a permanent magnet motor having a simplified structure is considered in which two types of permanent magnets having different coercive forces are arranged in a rotor at a suitable ratio so that each one magnetic pole is composed of one type of permanent magnets, thereby simplifying the construction.

Figure 10:
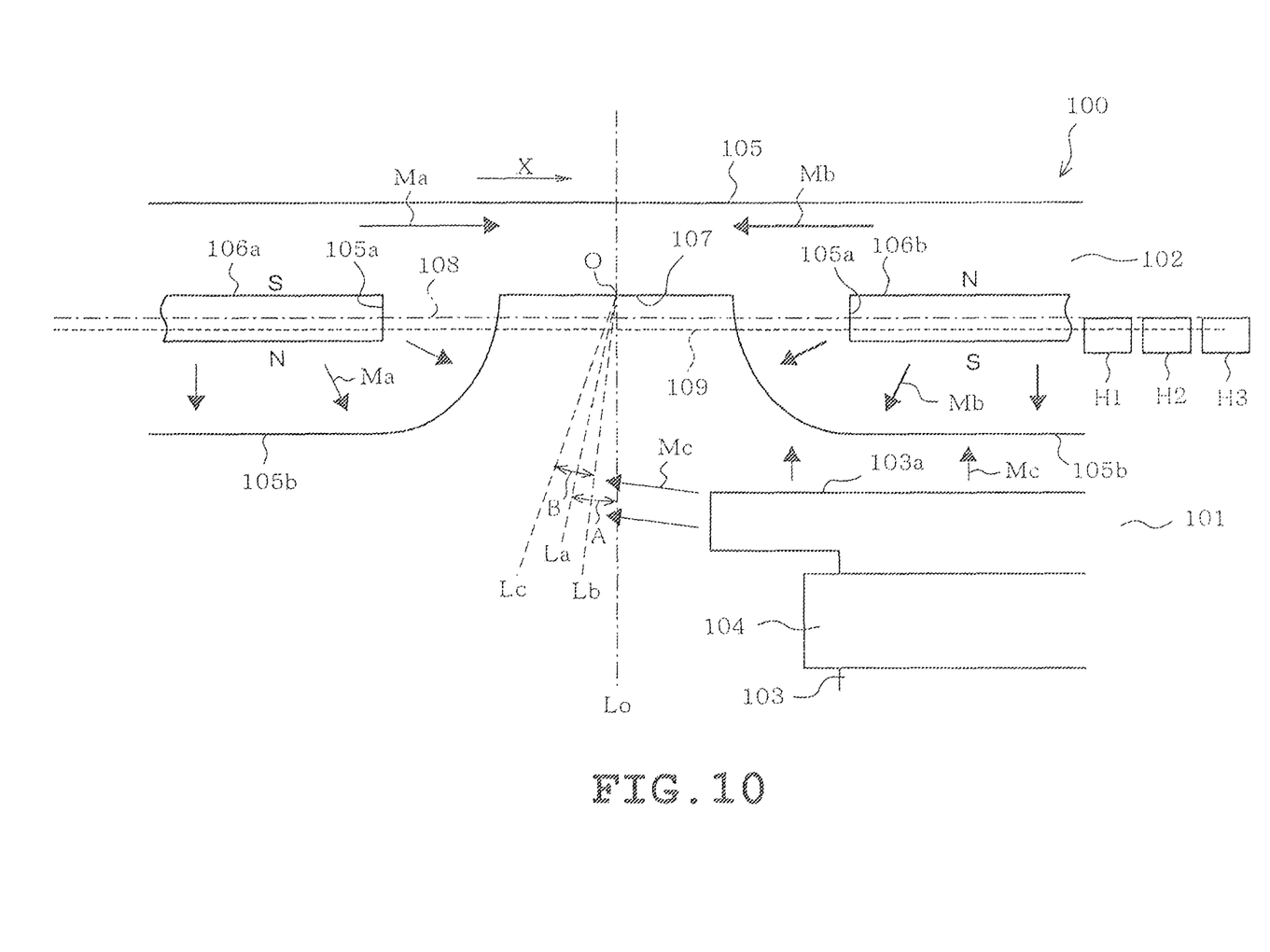
FIG. 10 is a view similar to FIG. 1, showing a reference example.

FIG. 10 shows a permanent magnet motor 100 which is based on the above-described consideration. The permanent magnet motor 100 is an outer rotor type three-phase brushless DC motor and includes a stator 101 and a rotor 102. FIG. 10 is a linear developed arrangement of portions of the stator 101 and the rotor 102 which correspond to two poles. The stator 101 includes a stator core 103 having a number of circumferentially arranged magnetic pole teeth 103a (only one shown) and multiphase or, for example, three-phase stator coils 104 (only one shown) wound on the stator core 103.

The rotor 102 includes a rotor core 105 having a number of circumferentially arranged magnet insertion holes 105a (only two shown) and permanent magnets inserted into the magnet insertion holes 105a respectively. The permanent magnets are divided into two types of permanent magnets 106a and 106b having different coercive forces and are arranged so that each one type constitutes one pole. For example, in FIG. 10, the permanent magnet 106a having a lower coercive force is inserted into one magnet insertion hole 105a (the left one as viewed in FIG. 10) so that a north pole (N) is located at the stator 101 side, for example. The permanent magnet 106b having a higher coercive force is inserted into the other magnet insertion hole 105a (the right one as viewed in FIG. 10) so that a south pole (S) is located at the stator 101 side.

In the above-described case, the rotor core 105 has an inner circumferential surface including portions which correspond to the permanent magnets 106a and 106b and are formed with protrusions 105b (magnetic pole portions) protruding toward the stator 101 side in arc shapes, respectively. A recess 107 is formed between the protrusions 105b adjacent to each other so as to extend to a part of the rotor 102 located between the permanent magnets 106a and 106b adjacent to each other. More specifically, the recess 107 is formed substantially in a middle part of the rotor 102 located between the adjacent permanent magnets 106a and 106b, so as to extend radially with respect to the permanent magnet motor 100. The recess 107 has an inner part located at the outer circumferential side relative to an imaginary central line 108 connecting between a boundary line between the north and south poles of the permanent magnet 106a and a boundary between the north and south poles of the permanent magnet 106b.

Hall ICs H1, H2 and H3 serving as three-phase magnetic sensors are disposed at one axial end surface side of the rotor 102 at intervals of electrical angle of 120 degrees. The Hall ICs H1 to H3 correspond to a trajectory 109 that is indicated by a line connecting between a line further connecting between pole N and a boundary line (the central line 108) between poles N and S of the permanent magnet 106a and a line connecting between pole S and the boundary line (the central line 108) between poles N and S of the permanent magnet 106b.

When the rotor 102 is rotated rightward (in the direction of arrow X), the Hall ICs H1 to H3 are moved along the trajectory 109 relatively leftward (in the direction opposed to direction X). The Hall ICs H1 to H3 then generate high-level detection signals corresponding to magnetic pole positions of the rotor 102 respectively. The three-phase stator coils 104 are energized so that the rotor 102 is rotated.

A rotational speed of the drum is low during a wash step or a rinse step of the washing operation, and a high torque and low speed rotation is accordingly required of the permanent magnet motor 100. Accordingly, the permanent magnets 106a are magnetized in order that magnetic flux thereof may be increased. The rotational speed of the drum is high during a dehydration step, and a low torque and high speed rotation is required of the permanent magnet motor 100. Accordingly, the permanent magnet 106a is demagnetized so that the magnetic flux thereof is decreased.

In the above-described construction, a case occurs where the magnetic force Ma of the permanent magnet 106a with the lower coercive force is smaller than the magnetic force Mb of the permanent magnet 106b with the higher coercive force during the dehydration step of the washing operation (Ma<Mb), as shown in FIG. 10. A boundary line Lo of the magnetic forces Ma and Mb is on a line connecting between the central point O located in the inner part of the recess 107 and a central point of the rotor 102 in a normal state where the magnetic forces Ma and Mb of the permanent magnets 106a and 106b are equal to each other. However, a space located nearer the stator 101 side than the inner part of the recess 107 is not a part of the rotor core 105. Accordingly, the space has an enormously large saturating magnetic force. As a result, when the magnetic force Ma of the permanent magnet 106a becomes weaker than the magnetic force Mb of the permanent magnet 106b (Ma<Mb), the boundary line is shown as a boundary line La shifted by angle A (mechanical angle) to the weaker magnetic force Ma side about the central point O. The boundary line La is subjected to a magnetic force Mc from the stator coil 104 thereby to be further shifted in a range of an angle B (mechanical angle) relative to the boundary line La, whereupon the boundary line La is changed into boundary lines Lb and Lc, for example.

In the construction as shown in FIG. 10, the relative movement trajectory 109 of the Hall ICs H1 to H3 passes through the aforesaid space located nearer the stator 101 side than the inner part of the recess 107. As a result, the detection signals generated by the respective Hall ICs H1 to H3 differ from each other. This results in differences among the three-phase current waveforms of the stator coil 104 which are energized based on the respective detection signals thereby to cause torque ripple.

DETAILED DESCRIPTION

In general, according to one embodiment, a permanent magnet motor includes a stator including a stator core, a multiphase stator coil wound on the stator core, and magnetic pole teeth corresponding to respective phases of the stator coil. A rotor includes a rotor core formed with a plurality of circumferentially arranged magnet insertion holes and a plurality of permanent magnets inserted into the magnet insertion holes respectively. The permanent magnets are configured to establish in the magnet insertion holes magnetic poles corresponding to the magnetic pole teeth of the stator. A magnetic sensor comprises a plurality of Hall ICs and is configured to detect positions of the magnetic poles of the rotor. The permanent magnets include a plurality of types of permanent magnets having different coercive forces including a plurality of permanent magnets each having a lower coercive force and a plurality of permanent magnets each having a higher coercive force. The plurality of types of permanent magnets are inserted into the magnet insertion holes so that each one pole corresponds to one of the types of permanent magnets. The rotor core includes a part located between two permanent magnets which are adjacent to each other and which have different coercive forces. The part is formed with a recess. The rotor core includes a magnetic flux path that is defined in the part thereof so as to be located nearer a side opposite the stator side than an inner part of the recess and so as to protrude to the stator side. Each permanent magnet has a first part facing the stator and a second part located opposite the stator along a radial direction of the rotor. The magnetic sensor is configured to be relatively moved along a trajectory corresponding both to a part of each permanent magnet located opposite the stator and to the magnetic flux path with rotation of the rotor. The rotor core comprises a plurality of pairs of divided cores, the divided cores of each pair being adjacent to each other, one divided core of each pair having two ends formed with respective engagement convexities and the other divided core of each pair having two ends formed with respective engagement concavities. A number of the permanent magnets having the lower coercive force and a number of the permanent magnets having the higher coercive force for each of the divided cores are the same as the other divided cores such that that the divided cores have an equal total flux. Therefore, the divided cores have an equal total flux.

A first embodiment will now be described with reference to FIGS. 1 to 7B. The first embodiment is directed to a drum type washing machine. Firstly, referring to FIGS. 7A and 7B, the drum type washing machine includes an outer casing 1 in which a water tub 2 is provided. The water tub 2 is formed into a substantially cylindrical shape and has an end or a rear 2a (a right end as viewed in FIG. 7A) that is closed. The water tub 2 is elastically supported by damper mechanisms (not shown) so that an axis thereof extends substantially horizontally. A rotating tub or a drum 3 is rotatably mounted in the water tub 2. The drum 3 is also formed into a substantially cylindrical shape and has an end or a rear 3a (a right end as viewed in FIG. 7A) that is closed. The drum 3 also has an axis thereof extending substantially horizontally. The drum 3 has a circumferential wall formed with a number of through holes (not shown). The outer casing 1 has a front 1a formed with an access opening through which laundry is put into and taken out of the drum 3. A door is pivotally mounted on the front 1a so as to close and open the access opening, although not shown in the drawings.

Figure 7A:
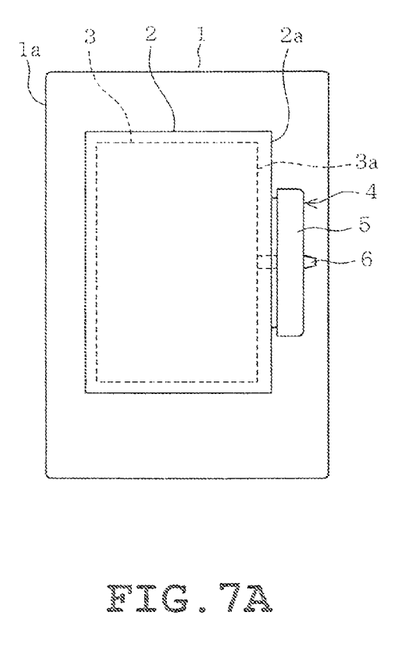
FIGS. 7A and 7B are a schematic longitudinal side section and a schematic longitudinal rear section of a drum type washing machine respectively.
Figure 7B:
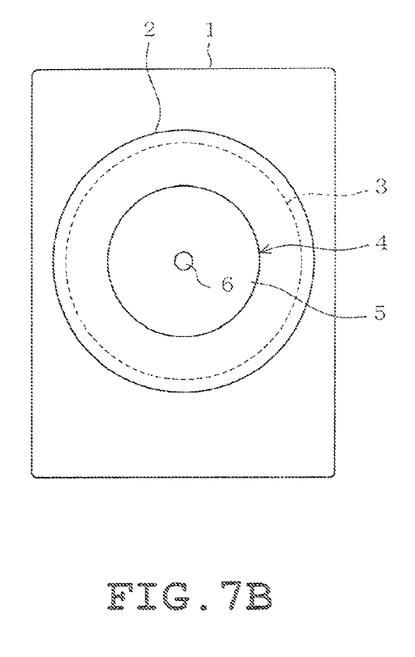

A permanent magnet motor 4 (hereinafter, "motor 4") is provided for rotating the drum 3. The motor 4 is mounted on the rear 2a of the water tub 2. The motor 4 comprises a three-phase brushless DC motor of the outer rotor type. The motor 4 includes a rotor 5 to which a shaft 6 is connected. The shaft 6 is further connected to the rear 3a of the drum 3. Thus, the washing machine of the embodiment employs a direct drive system in which the drum 3 is directly driven by the motor 4. The drum 3 serves as a washing machine load (load) driven by the motor 4.

The motor 4 will be described in detail with reference to FIGS. 1 to 5. The motor 4 includes a stator 7 which further includes a stator core 9 having an outer circumference formed with a number of, for example, thirty-six magnetic pole teeth 8, a multiphase or, for example, three-phase stator coil 10 wound on the teeth 8 and a mount 11 made of a synthetic resin. The stator 7 is fixedly mounted on the mount 11 further mounted on the rear 2a of the water tub 2. The stator core 9 comprises six equally divided cores 9A in the embodiment as shown in FIG. 5. Each divided core 9A has one of two ends which is formed with an engagement convexity 9a and the other end which is formed with an engagement concavity 9b. The engagement convexity 9a of each divided core 9A is inserted into the engagement concavity 9b of the adjacent divided core 9A, whereby the divided cores 9A are connected to one another thereby to be formed into the stator core 9. Accordingly, each divided core 9A has six magnetic pole teeth 8, and three magnetic pole teeth 8 adjacent to one another correspond to three-phases U, V and W respectively.

The rotor 5 includes a frame 12 having an annular wall 12a formed on an outer circumference thereof, a cylindrical rotor core 13 which is disposed along an inner circumference of the annular wall 12a and has a number of magnet insertion holes 17, and a plurality of, for example, two types of permanent magnets 14 and 15 which have different coercive forces and are inserted into the magnet insertion holes 17 respectively. The frame 12 is formed into the shape of a generally shallow receptacle and made of a magnetic material. The aforementioned shaft 6 is connected to a shaft mount 16 mounted on a central part of the frame 12. The rotor core 13 is made by stacking a number of annular iron core materials such as silicon steel sheets in the embodiment. Furthermore, each permanent magnet 14 with the lower coercive force (smaller coercive force) is constituted, for example, by an alnico magnet that is considered to have a lower coercive force (an alloy of aluminum, nickel and cobalt; and the alnico magnet has a coercive force of not more than 350 kA/m). Each permanent magnet 14 may comprise a samarium-cobalt magnet, instead of the alnico magnet. Each permanent magnet 15 with the higher coercive force (larger coercive force) is constituted, for example, by a neodymium magnet (the neodymium magnet has a coercive force of not less than 700 kA/m).

The rotor core 13 comprises three pairs of divided cores 13A and 13B adjacent to each other as shown in FIG. 5. Each divided core 13A or 13B includes eight permanent magnets 14 or 15 inserted into eight insertion holes 17 respectively so that north and south poles N and S are formed alternately. Character "S" affixed to the left side of each permanent magnet 14 or 15 in FIG. 5 designates a smaller coercive force and symbol "L" affixed to the left side of each permanent magnet 14 or 15 in FIG. 5 designates a larger coercive force. Furthermore, character "N" affixed to the right side of each permanent magnet 14 or 15 in FIG. 5 indicates that the magnetic pole the permanent magnet forms at the stator 7 side is the north pole N, and character "S" affixed to the right side of each permanent magnet 14 or 15 in FIG. 5 indicates that the magnetic pole the permanent magnet forms at the stator 7 side is the south pole S.

In the above-described case, one divided core 13A includes the magnetic pole teeth 8 of phases U, V, W, U, V and W arranged in this order from one side of a divided core 9A (the left side as viewed in FIG. 5). Accordingly are arranged the permanent magnet 14 with lower coercive force (S N), the permanent magnet 15 with higher coercive force (L S), the permanent magnet 15 with higher coercive force (L N), the permanent magnet 15 with higher coercive force (L S), the permanent magnet 15 with higher coercive force (L N), the permanent magnet 15 with higher coercive force (L S) and the permanent magnet 15 with higher coercive force (L S) and the permanent magnet 15 with higher coercive force (L S).

In the other divided core 13B, phases U, V, W, U, V and W are arranged in this order from one side of the divided core 9A (the left side as viewed in FIG. 5). Accordingly are arranged the permanent magnet 15 with higher coercive force (L N), the permanent magnet 15 with higher coercive force (L S), the permanent magnet 14 with lower coercive force (S N), the permanent magnet 15 with higher coercive force (L S), the permanent magnet 15 with higher coercive force (L N), the permanent magnet 15 with higher coercive force (L S), the permanent magnet 15 with higher coercive force (L N) and the permanent magnet 15 with higher coercive force (L S).

The paired divided cores 13A and 13B thus include one permanent magnet 14 with lower coercive force and seven permanent magnets 15 each of which has the higher coercive force. As a result, the magnetic flux content of the divided core 13A is substantially equal to the magnetic flux content of the divided core 13B and vice versa. However, the permanent magnet 14 with the lower coercive force occupies the left side first position in one divided core 13A, whereas the permanent magnet 14 with the lower coercive force occupies a third position from the left side in the other divided core 13B. Thus, the permanent magnets 14 and 15 are arranged in different orders.

Furthermore, one divided core 13A has both ends formed with rectangular engagement convexities 13a serving as engaging portions respectively, whereas the other divided core 13B has both ends formed with rectangular concavities 13b serving as engaged portions respectively. As a result, when the divided cores 13A and 13B are paired, the engagement convexities 13a (the engaging portions) of the divided core 13A are engageable with the engagement concavities 13b (the engaged portions) of the divided core 13B.

However, when unpaired two divided cores 13A are to be combined with each other, the engagement convexities 13a of one divided core 13A cannot engage the engagement convexity 13a of the other divided core 13A. When unpaired two divided cores 13B are to be combined with each other in a similar manner, the engagement concavity 13b of one divided core 13B cannot engage the engagement concavity 13b of the other divided core 13B.

Twelve phase U stator coils 10 wound on the twelve magnetic pole teeth 8 of the rotor core 13 respectively are serially connected in the above-described motor 4. Twelve phase V stator coils 10 wound on the twelve magnetic pole teeth of the rotor core 13 respectively are also serially connected. Twelve phase W stator coils 10 wound on the twelve magnetic pole teeth 8 of the rotor core 13 respectively are further serially connected in the above-described motor 4. These series circuits are thereafter connected in a star configuration. A control device serving as a control unit includes a microcomputer and is provided for controlling the motor 4 via an inverter circuit although not shown. The control device has a function of controlling a washing operation including, for example, wash, rinse and dehydration steps based on detection signals generated by Hall ICs H1, H2 and H3 serving as magnetic sensors as will be described in detail later.

Figure 1:
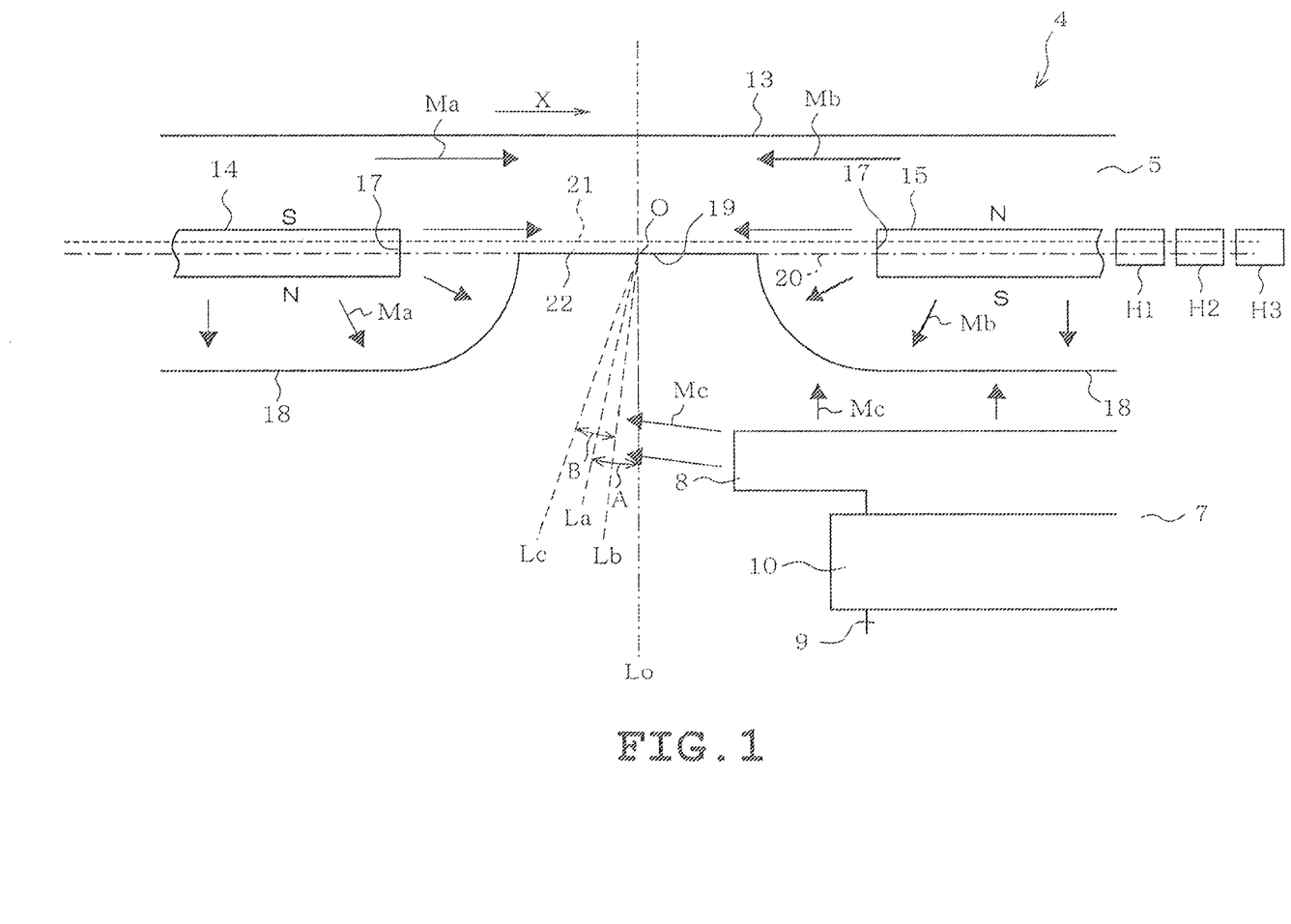
FIG. 1 is a partially enlarged view of a permanent magnet motor according to a first embodiment, showing the part of the permanent magnet motor in a linear developed form in one phase.
Figure 2:
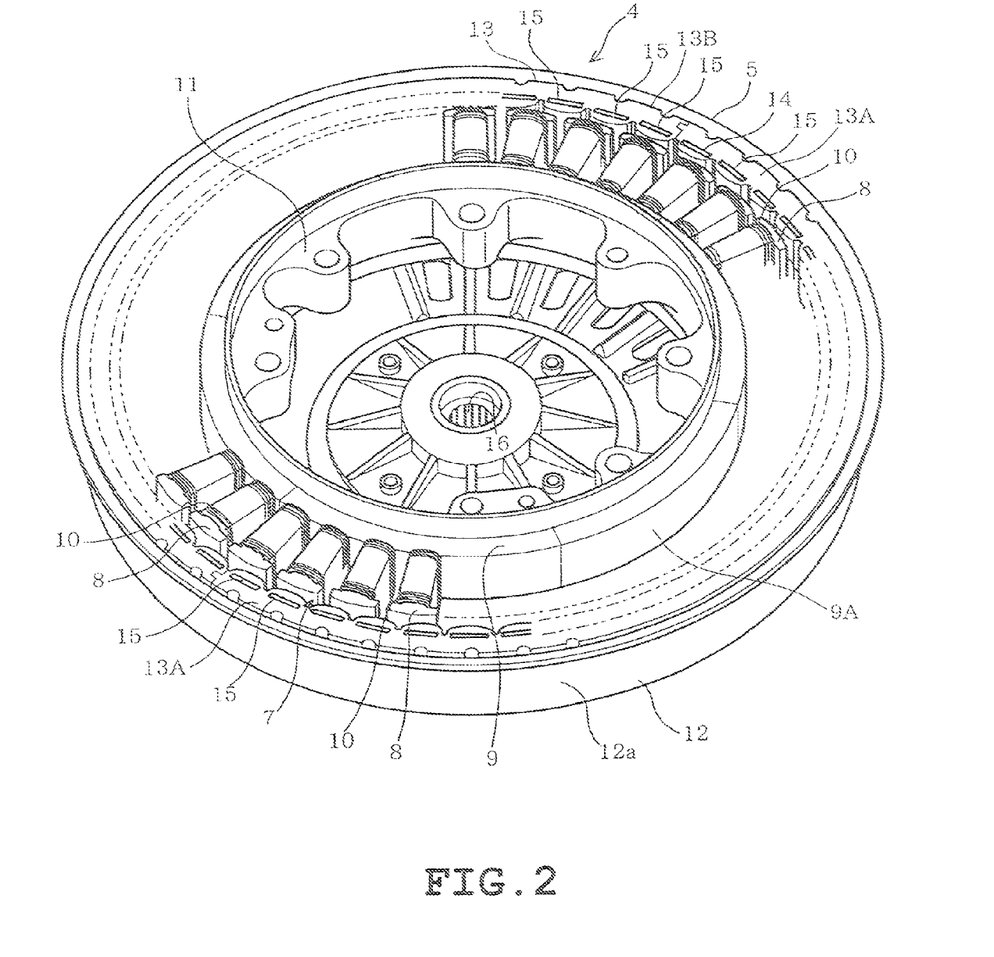
FIG. 2 is a perspective view of the permanent magnet motor.
Figure 3:
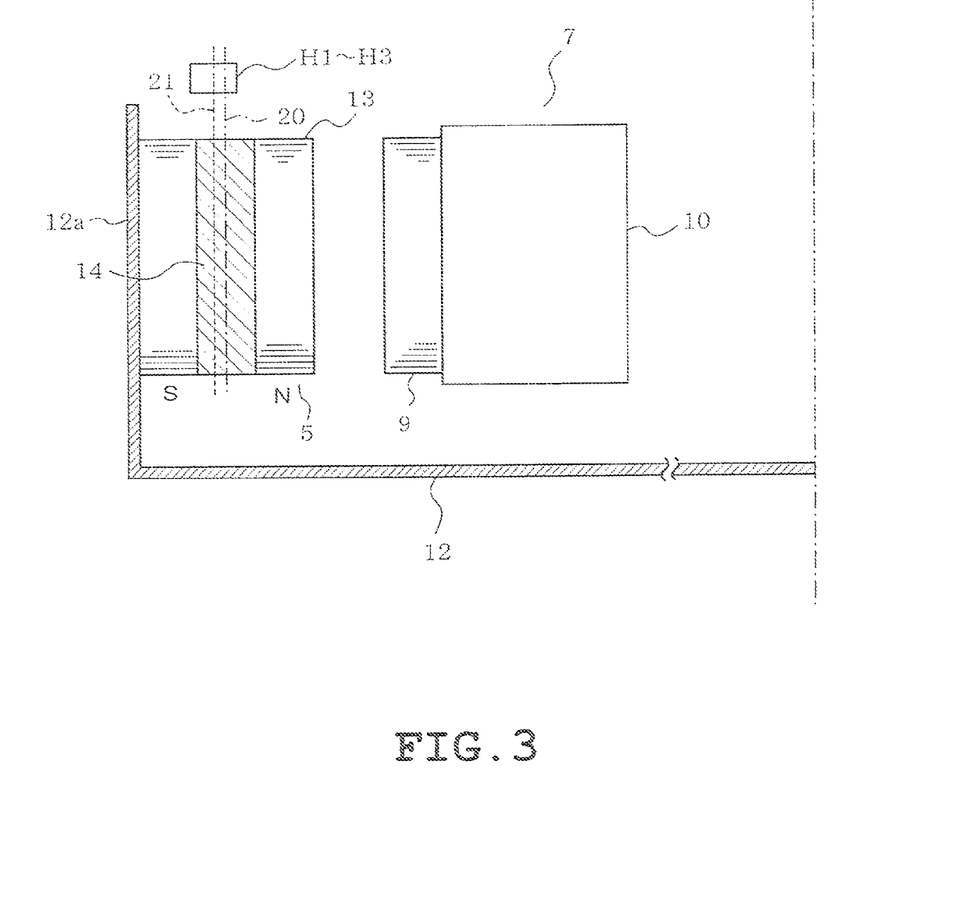
FIG. 3 is an enlarged sectional view of a left half of the permanent magnet motor.
Figure 4:
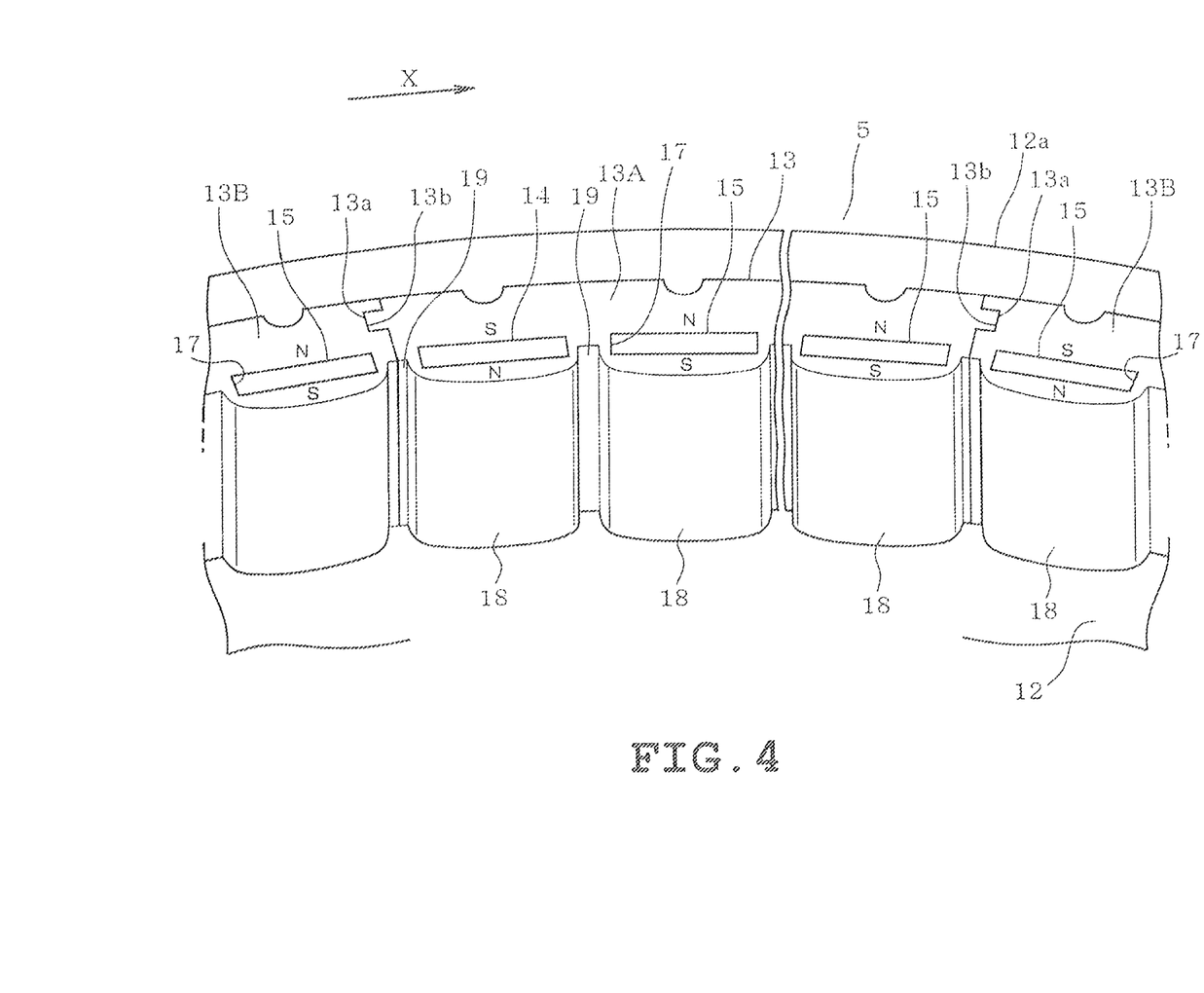
FIG. 4 is a partially enlarged perspective view of a rotor.
Figure 5:
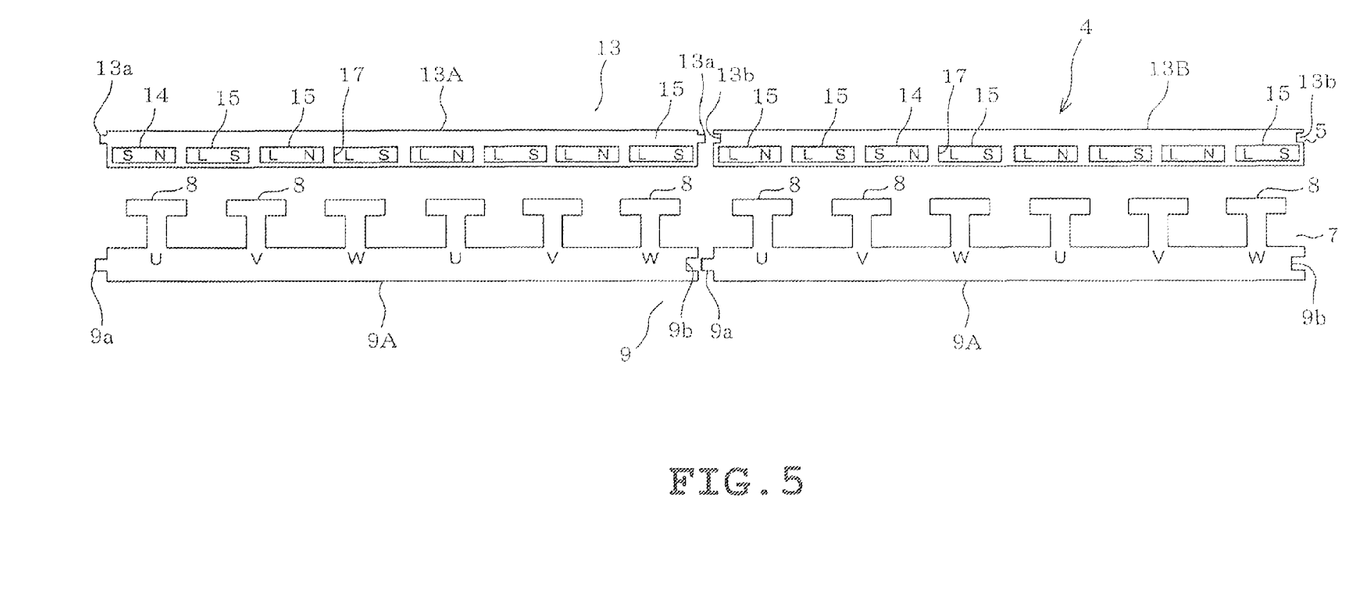
FIG. 5 is a partially enlarged view of the permanent magnet motor, showing the part of the permanent magnet motor in a linear developed form in another phase.

The rotor core 13 has an inner circumferential surface including portions thereof corresponding to the permanent magnets 14 and 15 respectively as shown in FIGS. 1 and 4. These portions of the rotor core 13 are formed with protrusions (magnetic pole portions) 18 protruding toward the stator 7 side into arc-like shapes, respectively. A recess 19 is formed between the protrusions 18 adjacent to each other so as to extend to a part of the rotor 5 located between the permanent magnets 14 and 15 adjacent to each other. More specifically, the recess 19 is formed substantially in a middle part of the rotor 5 located between the adjacent permanent magnets 14 and 15, so as to extend radially with respect to the permanent magnet motor 4. The recess 19 has an inner part located at the outer circumferential side relative to an imaginary central line 20 connecting between a boundary line between the north and south poles of the permanent magnet 14 and a boundary between the north and south poles of the permanent magnet 15. Additionally, the protrusions 18 corresponding to the adjacent permanent magnets 15 and the recess 19 between the protrusions 18 are constructed in the same manner as described above.

The Hall ICs H1 to H3 serving as three-phase magnetic sensors are disposed at one axial end surface side of the rotor 5 at intervals of electrical angle of 120 degrees. The Hall ICs H1 to H3 correspond to a trajectory 21 that is indicated by a line connecting between a line further connecting between pole N and a boundary line (the central line 20) between poles N and S of the permanent magnet 14 and a line connecting between pole S and the boundary line (the central line 20) between poles N and S of the permanent magnet 15. When the rotor 5 is rotated rightward (in the direction of arrow X) as viewed in FIG. 1, the Hall ICs H1 to H3 are moved along the trajectory 21 relatively leftward (in the direction opposed to direction X). The Hall ICs H1 to H3 then generate high-level detection signals corresponding to magnetic pole positions of the rotor 102 respectively. Based on the detection signals, the three-phase stator coils 10 are energized so that the rotor 5 is rotated.

The motor 4 and the drum type washing machine will work as follows. Upon start of the washing operation, the control device firstly executes a wash step. In the wash step, the control device opens a water-supply valve (not shown) serving as the washing machine load to execute a water supplying operation in which water is supplied into and stored in the water tub 2 and accordingly the drum 3. The control device rotates the drum 3 by the motor 4 at a low rotational speed (50 to 60 rpm, for example) alternately repeatedly in the normal and reverse directions with a detergent having been supplied into the water tub 2. Thus, the control device executes the wash operation to clean laundry in the drum 3. The control device stops the drum 3 after execution of the wash operation for a predetermined time period. The control device then opens a drain valve (not shown) which is connected to an outlet (not shown) of the water tub 2 and serves as the washing machine load. The control device thus executes a drain operation to discharge the water in the water tub 2 (the drum 3) through the outlet to the outside of the washing machine.

The control device then executes an intermediate dehydration in the wash step. In the intermediate dehydration, the control device rotates the drum 3 by the motor 4 in one direction at a high speed (1500 rpm, for example). As a result, the laundry in the drum 3 is centrifugally dehydrated. Water extracted from the laundry by the centrifugal dehydration is discharged through the outlet to the outside of the machine.

Upon completion of the intermediate dehydration, the control device proceeds to the rinse step. In the rinse step, the control device again executes a water supplying operation to supply and store water into and in the water tub 2 and the drum 3 with rotation of the drum 3 being stopped. The control device then executes the rinse operation in which the control device carries out the same control manner as in the wash operation except for use of the detergent. More specifically, the control device rotates the drum 3 by the motor 4 at a low rotational speed (50 to 60 rpm, for example) alternately repeatedly in the normal and reverse directions, thereby executing a rinse operation in which the laundry in the drum 3 is rinsed for a predetermined time period. Thereafter, the control device executes the same water discharge operation as described above. The control device repeats the same water supply, rinse and water discharge operations at a plurality of times, thereafter completing the rinse step.

The control device then executes the dehydration step. In the dehydration step, the control device rotates the motor 4 to rotate the drum 3 in one direction at a high speed (1,000 rpm, for example) with the result that the laundry is centrifugally dehydrated in the drum 3. Water extracted from the laundry is discharged through the outlet to the outside of the machine. The control device carries out the above-described dehydration operation for a predetermined time period, thereafter completing the dehydration step and accordingly the washing operation.

The rotational speed of the drum 3 is low (50 to 60 rpm) in the wash operation of the above-described wash step. In this case, the motor 4 necessitates a low speed and high torque rotation. Accordingly, the control device carries out magnetization, for example, during the water supply operation before the wash operation of the wash step in order that magnetic flux of the permanent magnets 14 of the motor 4 may be increased. More specifically, the control device applies voltage of +500 V to the stator coil 10, for example, so that the magnetic flux of the permanent magnets 14 is increased to the maximum and so that the magnetic flux remains increased even after release of the permanent magnets 14 from voltage application. As a result, the magnetic flux content the whole rotor 5 applies to the stator 7 is increased. In this state, the control device rotates the drum 3 by the motor 4 at the low speed thereby to execute the wash operation of the wash step, whereupon the motor 4 can deliver high torque. The normal operation voltage of the motor 4 ranges between about ±200 V in execution of the wash step. Accordingly, the magnetic flux of the permanent magnets 14 can be prevented from being changed during the normal operation even when each permanent magnet 14 has a lower coercive force.

The rotational speed of the drum 3 (the motor 4) is high (1500 rpm) in the intermediate dehydration of the above-described wash step. In this case, the motor 4 necessitates a high speed and low torque rotation. Accordingly, the control device carries out demagnetization, for example, during the water discharge operation before the intermediate dehydration in order that magnetic flux of the permanent magnets 14 of the motor 4 may be decreased. More specifically, the control device applies voltage slightly higher than −500 V to the stator coil 10, for example, so that the magnetic flux of the permanent magnets 14 is decreased to 0 (zero) and so that the magnetic flux remains decreased even after release of the permanent magnets 14 from voltage application. As a result, the magnetic flux content the whole rotor 5 applies to the stator 7 is decreased. In this state, the control device rotates the drum 3 by the motor 4 at a high speed thereby to execute the intermediate dehydration. Consequently, the motor 4 is rendered suitable for a high speed and low torque rotation. In the intermediate dehydration, too, the normal operation voltage of the motor 4 ranges between about ±200 V in execution of the wash step. Accordingly, the magnetic flux of the permanent magnets 14 can be prevented from being changed during the normal operation even when each permanent magnet 14 has a lower coercive force.

Next, the rotational speed of the drum 3 (the motor 4) is low (50 to 60 rpm) in the rinse operation of the rinse step in the same manner as in the wash operation of the wash step. The motor 4 necessitates a low speed and high torque rotation (50 to 60 rpm) in a rinse operation of the rinse step in the same manner as in the wash operation of the wash step. Accordingly, the control device carries out magnetization, for example, during the water supply operation before the rinse operation in order that magnetic flux of the permanent magnets 14 of the motor 4 may be increased. Thus, the control device executes the rinse step with the magnetic flux of the permanent magnets 14 being increased.

In the dehydration step, the rotational speed of the drum (the drum 4) is high (1,000 rpm) as in the intermediate dehydration step. The motor 4 necessitates a high speed and low torque rotation. Accordingly, the control device carries out demagnetization in the same manner as described above, thereby executing the dehydration step with the magnetic flux of the permanent magnets 14 being decreased.

The recess 19 is located between the protrusions 18 (between the magnetic pole portions) corresponding to the adjacent permanent magnets 14 and 15 as shown in FIG. 1. The recess 19 is formed so that an inner part thereof is located on a central line 20. Furthermore, a magnetic flux path 22 extending to the stator 7 side is formed in a part of the rotor core 13 located between the permanent magnets 14 and 15. Accordingly, a trajectory 21 relative to which the Hall ICs H1 to H3 are moved passes the magnetic flux path 22. The recess 19 located between the protrusions 18 corresponding to the permanent magnets 15 adjacent to each other is also formed in the same manner as described above.

A case occurs where the magnetic force Ma of the permanent magnet 14 with the lower coercive force is smaller than the magnetic force Mb of the permanent magnet 15 with the higher coercive force during the dehydration step of the washing operation (Ma<Mb), as described above. A boundary line Lo of the magnetic forces Ma and Mb is on a line connecting between the central point O located in the inner part of the recess 19 and a central point of the rotor 5 in a normal state where the magnetic forces Ma and Mb of the permanent magnets 14 and 15 are equal to each other. However, a space located nearer the stator 7 side than the inner part of the recess 19 is not a part of the rotor core 13. Accordingly, the space has an enormously large saturating magnetic force. As a result, when the magnetic force Ma of the permanent magnet 14 becomes weaker than the magnetic force Mb of permanent magnet 15 (Ma<Mb), the boundary line is shown by a boundary line La shifted by angle A (mechanical angle) to the weaker magnetic force Ma side about the central point O. The boundary line La is subjected to a magnetic force Mc from the stator coil 10 thereby to be further shifted in a range of an angle B (mechanical angle) relative to the boundary line La, whereupon the boundary line La is changed into boundary lines Lb and Lc, for example.

In the embodiment, the trajectory 21 of relative movement of the Hall ICs H1 to H3 passes the magnetic flux path 22 located nearer the side opposite the stator 7 side than the inner part of the recess 19 without passing the aforementioned space located nearer the stator 7 side than the inner part of the recess 19. The magnetic flux path 22 has a high permeability and a small saturating magnetic force since it is a part of the rotor core 13. Accordingly, the magnetic flux path 22 is magnetically saturated such that the magnetic flux becomes constant irrespective of the difference between the intensities of the magnetic forces Ma and Mb. More specifically, the Hall ICs H1 to H3 are not influenced by the boundary lines La, Lb and Lc in the embodiment.

Figures 6A, 6B:
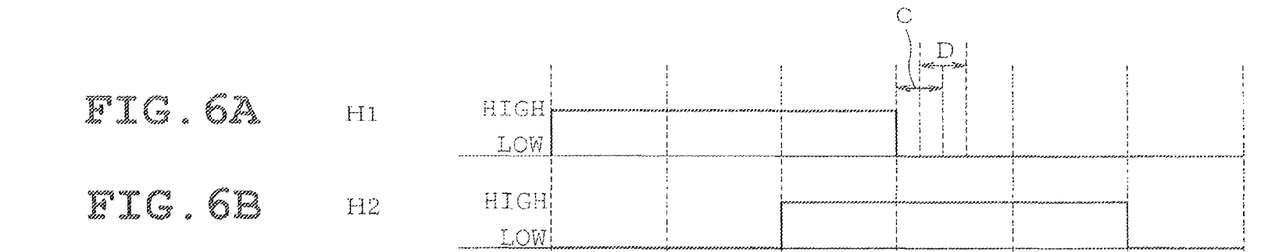
FIGS. 6A to 6D are waveform charts for explaining the operation of the permanent magnet motor.
Figure 6C:
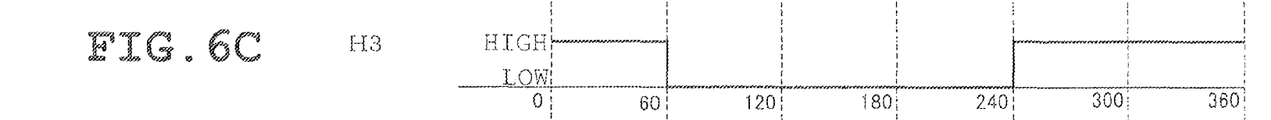
Figure 6D:
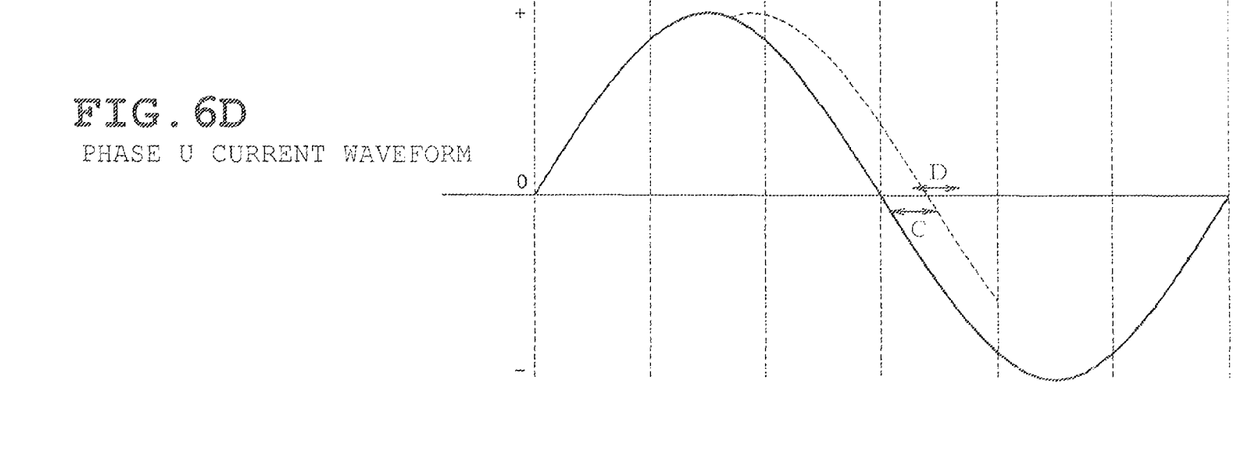

FIGS. 6A to 6D are waveform charts of the Hall ICs H1 to H3 and the phase U current waveform. FIG. 6A shows a detection signal of the Hall IC H1, FIG. 6B shows a detection signal of the Hall IC H2 and FIG. 6C shows a detection signal of the Hall IC H3. Voltage is applied to each of phases U, V and W of the stator coil 10 during high-level periods of the detection signals of the Hall ICs H1 to H3 respectively, whereupon the current flows in the phases U, V and W (180-degree energization system). As a result, a current having a waveform as shown in FIG. 6D flows in the phase U of the stator coil 10.

The Hall ICs H1 to H3 are not influenced by the boundary lines La, Lb and Lc resulting from the differences in the intensities of magnetic forces Ma and Mb. Accordingly, the detection signals of the Hall ICs become high levels in the period of 180 degrees while shifted from one another by an electrical angle of 120 degrees as shown by solid lines in FIGS. 6A to 6C. As a result, for example, a positive half-wave sinusoidal current flows into the phase U of the stator coil 10 in the period from 0 to 180 degrees in electrical angle as shown by solid line in FIG. 6D.

In the reference example as shown in FIG. 10, however, the Hall ICs are influenced by the boundary lines La, Lb and Lc. Accordingly, in the case of the Hall IC H1 for phase U of the stator coil 104, the fall of the detection signal from high level to low level is shifted by angle C (electrical angle) corresponding to angle A (mechanical angle) and is further shifted by angle D (electrical angle) corresponding to angle B (mechanical angle) as shown by broken line in FIG. 6A. As a result, the current flowing into phase U of the stator coil 104 does not become 0 at the electrical angle of 180 degrees but is shifted while remaining positive (+), as shown by broken line in FIG. 6D. This results in torque ripple in the permanent magnet motor of the reference example.

The following advantageous effects can be achieved from the above-described construction. Each one of the divided cores 13A and 13B of the rotor 5 has the permanent magnets 14 each of which has a lower coercive force and an easily variable magnetic force and the permanent magnets 15 each of which has a higher coercive force than the permanent magnets 14. The control device magnetizes the permanent magnets 14 in the wash step and the rinse step so that the magnetic flux of the rotor 5 acting on the stator 7 is increased. Furthermore, the control device magnetizes the permanent magnets 14 in the dehydration step and the intermediate dehydration of the wash step so that the magnetic flux of the rotor 5 acting on the stator 7 is rendered smaller than in the wash step and rinse step. As a result, the magnetic flux of the rotor 5 acting on the stator 7 can be increased in the wash step and the rinse step, whereby the motor 4 driving the washing machine load (the drum 3) can achieve the low speed and high torque rotation necessary for the wash and rinse steps. Furthermore, the magnetic flux of the rotor 5 acting on the stator 7 can be rendered smaller in the dehydration step and the intermediate dehydration than in the wash step and the rinse step, whereby the motor 4 driving the load (the drum 3) can deliver the performance suitable for the high speed and low torque rotation necessary for dehydration.

The magnetic flux path 22 extending to the stator 7 side is formed in the part of the rotor core 13 located between the permanent magnets 14 and 15 adjacent to each other. The trajectory 21 relative to which the Hall ICs H1 to H3 are moved passes over the magnetic flux path 22. Since the magnetic flux path 22 is a part of the rotor core 13 and has a high permeability and a small saturating magnetic force, the magnetic flux path 22 is magnetically saturated such that the magnetic flux becomes constant irrespective of the difference between the intensities of the magnetic forces Ma and Mb. Consequently, the Hall ICs H1 to H3 can supply normal detection signals without being influenced by the boundary lines La, Lb and Lc. Accordingly, the motor 4 can be prevented from causing torque ripple due to the differences between the intensities of the magnetic forces Ma and M.

The Hall ICs H1 to H3 are moved along the trajectory 21 that is the line connecting between the first and second lines. The first line connects between the boundary line (the central line 20) between the north and south poles of each permanent magnet 14 and the south pole S (the side opposed to the stator 7). The second line connects between the boundary line (the central line 20) between the north and south poles N and S of each permanent magnet 15 and the north pole N (the side opposed to the stator 7). More specifically, the Hall ICs H1 to H3 pass the location opposed to the stator 7 sides of the permanent magnets 14 and 15. As a result, the Hall ICs H1 to H3 can be prevented from being influenced by magnetic force Mc from the stator coil 10 of the stator 7.

Figure 8:
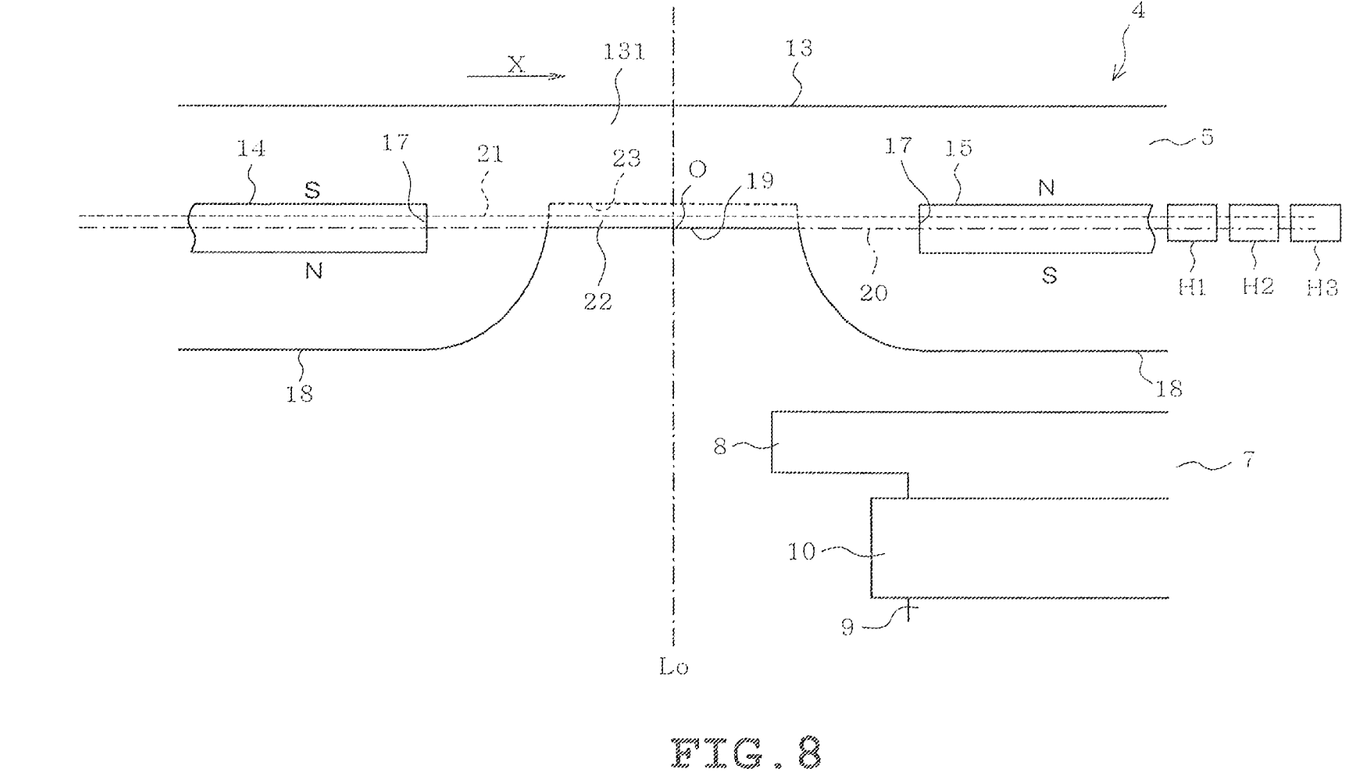
FIG. 8 is a view similar to FIG. 1, showing a second embodiment.
Figure 9:
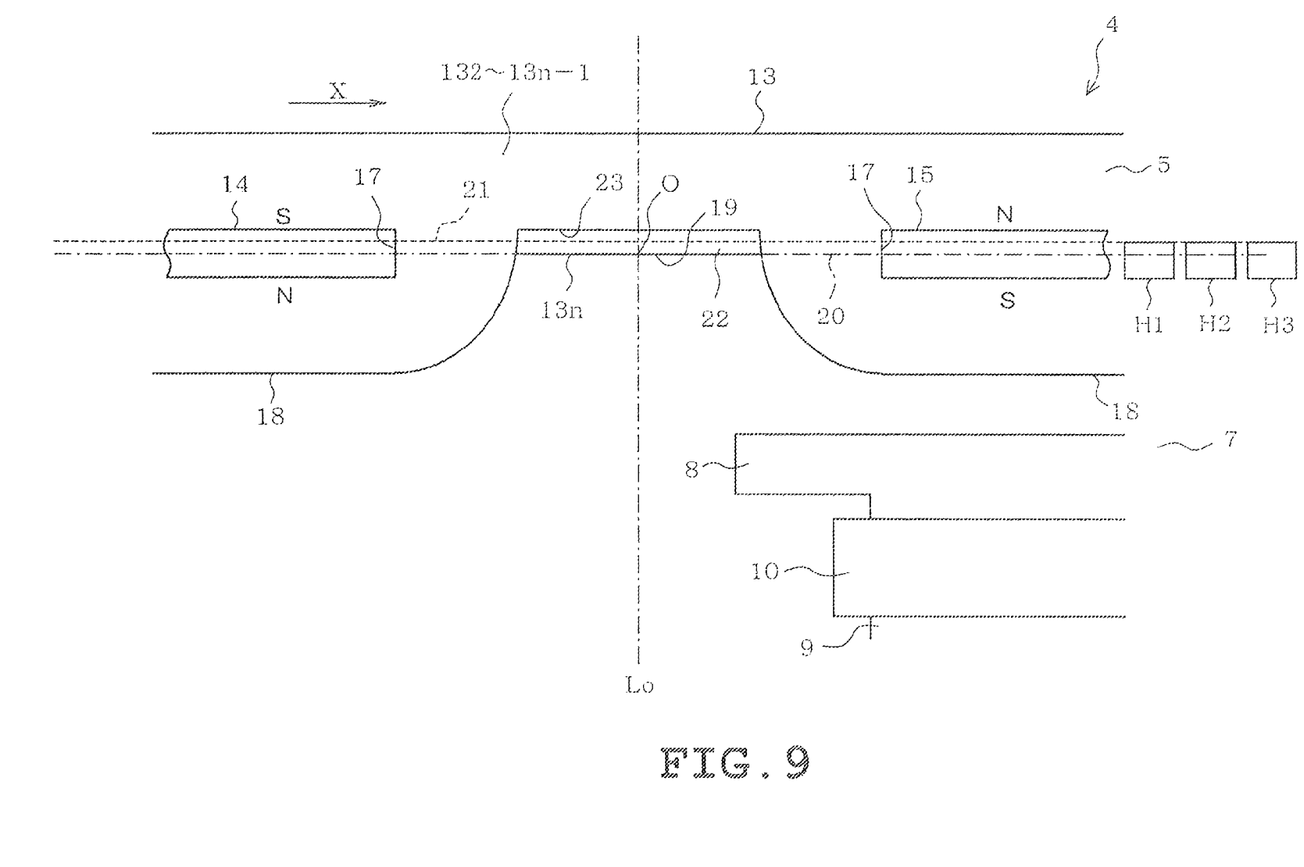
FIG. 9 is a view similar to FIG. 8, showing the permanent magnet motor in another phase.

FIGS. 8 and 9 illustrate a second embodiment. In the second embodiment, identical or similar parts are labeled by the same reference symbols as those in the first embodiment. The rotor core 13 is made by stacking a number of iron core materials as described above in the first embodiment. In the second embodiment, the rotor 5 is constituted by using a first iron core material 131 to an n-th number of iron core material (n=39, for example).

The rotor core 13 has both axial ends, and the first iron core material 131 located at one axial end side is formed with the recess 19 and the magnetic flux path 22 both located between the permanent magnets 14 and 15 adjacent to each other, as shown in FIG. 8. Furthermore, the n-th iron core material 131 located at the other axial end side is formed with the recess 19 and the magnetic flux path 22 both located between the permanent magnets 14 and 15 adjacent to each other, as shown in FIG. 9. As shown in FIG. 9, the second to (n−1)-th iron core materials 132 to 13(n−1) are formed with respective recesses 23 which are similar to the recess 107 of the rotor core 105 of the reference example as shown in FIG. 10. More specifically, the recess 23 is formed so as to be located outside the trajectory 21 of the Hall ICs H1 to H3. Accordingly, the iron core materials 132 to 13(n−1) are formed with no magnetic flux paths 22.

The second embodiment can achieve the same operation and advantageous effects as those of the first embodiment. The magnetic flux flowing into the magnetic flux path 22 becomes a leakage magnetic flux that does not act on the stator coil 10 of the stator 7. Only the first iron core material 131 located at one end side of the rotor core 13 and the n-th iron core material 13(n) located at the other end side have respective magnetic flux paths 22. Consequently, the second embodiment is advantageous in that leakage magnetic flux resulting from the magnetic flux path 22 can be rendered as small as possible.

The foregoing embodiments described above with reference to the drawings should not be restrictive but may be modified as follows. The permanent magnets 15 which are adjacent to each other and have a higher coercive force are also provided with the recesses 19 respectively. The recess 23 as employed in the second embodiment may be provided between the permanent magnets 15, instead of the recesses 19.

The first iron core material 131 located at one axial end side and the n-th iron core material 13(n) located at the other axial end side are provided with the respective recesses 19 in the second embodiment. However, a plurality of iron core materials located at each one of both axial ends of the rotor core may be provided with the recesses 19, instead.

The rotor core is constructed by combining divided cores in the foregoing embodiments. However, this construction may or may not be applied. Furthermore, the foregoing embodiments have been applied to the drum type washing machine but may be applied to every type of washing machine.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A permanent magnet motor comprising:
a stator including a stator core, a multiphase stator coil wound on the stator core, and magnetic pole teeth corresponding to respective phases of the stator coil;
a rotor including a rotor core formed with a plurality of circumferentially arranged magnet insertion holes and a plurality of permanent magnets inserted into the magnet insertion holes respectively, the permanent magnets being configured to establish in the magnet insertion holes magnetic poles corresponding to the magnetic pole teeth of the stator, each permanent magnet comprising a first part facing the stator and a second part located opposite the stator along a radial direction of the rotor; and
a magnetic sensor comprising a plurality of Hall ICs and configured to detect positions of the magnetic poles of the rotor, wherein:
the permanent magnets include a plurality of types of permanent magnets having different coercive forces including a plurality of permanent magnets each having a lower coercive force and a plurality of permanent magnets each having a higher coercive force, the plurality of types of permanent magnets being inserted into the magnet insertion holes so that each one pole corresponds to one of the types of permanent magnets;
the rotor core includes a part located between two permanent magnets which are adjacent to each other and which have different coercive forces, the part including a recess;
the rotor core includes a magnetic flux path that is defined in the part thereof so as to be located nearer a side opposite the stator side than an inner part of the recess and so as to protrude to the stator side;
the rotor core includes a plurality of pairs of divided cores, the divided cores of each pair being adjacent to each other, one divided core of each pair comprising two ends formed with respective engagement convexities and the other divided core of each pair comprising two ends formed with respective engagement concavities;

a number of the permanent magnets having the lower coercive force and a number of the permanent magnets having the higher coercive force for each of the divided cores are the same as the other divided cores such that that the divided cores have an equal total flux; and the magnetic sensor is configured to be relatively moved along a trajectory corresponding both to the second part of each permanent magnet located opposite the stator and to the magnetic flux path with rotation of the rotor.

2. The motor according to claim 1, wherein the rotor core is made by stacking a plurality of iron core materials and the magnetic flux paths are formed in two iron core materials constituting both axial ends of the rotor.

3. The motor according to claim 1, wherein the trajectory along which the magnetic sensor is moved passes a location opposed to the stator side of each permanent magnet.

4. The motor according to claim 2, wherein the trajectory along which the magnetic sensor is moved passes a location opposed to the stator side of each permanent magnet.

5. A washing machine comprising a permanent magnet motor including:
   a stator including a stator core, a multiphase stator coil wound on the stator core and magnetic pole teeth corresponding to respective phases of the stator coil;
   a rotor including a rotor core formed with a plurality of circumferentially arranged magnet insertion holes and a plurality of permanent magnets inserted into the magnet insertion holes respectively, the permanent magnets being configured to establish in the magnet insertion holes magnetic poles corresponding to the magnetic pole teeth of the stator, each permanent magnet comprising a first part facing the stator and a second part located opposite the stator along a radial direction of the rotor; and
   a magnetic sensor comprising a plurality of Hall ICs and configured to detect positions of the magnetic poles of the rotor, wherein:
   the permanent magnets include a plurality of types of permanent magnets having different coercive forces including a plurality of permanent magnets each having a lower coercive force and a plurality of permanent magnets each having a higher coercive force, the plurality of types of permanent magnets being inserted into the magnet insertion holes so that each one pole corresponds to one of the types of permanent magnets;
   the rotor core includes a part located between two permanent magnets which are adjacent to each other and which have different coercive forces, the part including a recess;
   the rotor core includes a magnetic flux path that is defined in the part thereof so as to be located nearer a side opposite the stator side than an inner part of the recess and so as to protrude to the stator side;
   the rotor core includes a plurality of pairs of divided cores, the divided cores of each pair being adjacent to each other, one divided core of each pair comprising two ends formed with respective engagement convexities and the other divided core of each pair comprising two ends formed with respective engagement concavities;
   a number of the permanent magnets having the lower coercive force and a number of the permanent magnets having the higher coercive force for each of the divided cores are the same as the other divided cores such that that the divided cores have an equal total flux;
   the magnetic sensor is configured to be relatively moved along a trajectory corresponding both to the second part of each permanent magnet located opposite the stator and to the magnetic flux path with rotation of the rotor; and
   the permanent magnet motor is configured to rotate a washing machine load.

6. The washing machine according to claim 5, wherein the rotor core is made by stacking a plurality of iron core materials and the magnetic flux paths are formed in two iron core materials constituting both axial ends of the rotor.

7. The washing machine according to claim 5, wherein the trajectory along which the magnetic sensor is moved passes a location opposed to the stator side of each permanent magnet.

8. The washing machine according to claim 6, wherein the trajectory along which the magnetic sensor is moved passes a location opposed to the stator side of each permanent magnet.

* * * * *